United States Patent [19]
Spille

[11] Patent Number: 5,524,054
[45] Date of Patent: Jun. 4, 1996

[54] METHOD FOR GENERATING A MULTI-CHANNEL AUDIO DECODER MATRIX

[75] Inventor: Jens Spille, Laatzen, Germany

[73] Assignee: Deutsche Thomson-Brandt GmbH, Villengen-Schwenningen, Germany

[21] Appl. No.: 264,131

[22] Filed: Jun. 21, 1994

[30] Foreign Application Priority Data

Jun. 22, 1993 [EP] European Pat. Off. .............. 93401609

[51] Int. Cl.⁶ ....................................... H04S 3/02
[52] U.S. Cl. ................................. 381/18; 381/20
[58] Field of Search ................. 381/20, 22, 23, 381/18, 19, 21

[56] References Cited

FOREIGN PATENT DOCUMENTS

| | | | |
|---|---|---|---|
| 0631458A1 | 12/1994 | European Pat. Off. .......... | H04S 3/02 |
| 093018630A | 9/1993 | WIPO ............................... | H04S 3/02 |

OTHER PUBLICATIONS

Von Warner et al., "Eine Neue Codiertechnik fur Surround--Stereo-Surround (4-2-4)," Rundfunktechniche Mitteilungen vol. 35, No. 1, Jan./Feb. 1991, Germany.

W. R. Th. ten Kate et al., "Matrixing of Bit Rate Reduced Audio Signals," ICASSP 92 IEEE International Conference on Acoustics, Speech and Signal Processing, vol. 2, Mar. 1992.

Suganami et al., "A sound Reproduction and Trasmission System for HDTV," HDTV 90 Fourth International Colloquium on Advanced Television Systems, Jun. 1990.

A Committee Draft of MPEG audio specification ISO/IEC 13818-3, pp. iv–ix and 26–28 describes aspects of the MPEG audio processing standard.

*Primary Examiner*—Scott A. Rogers
*Assistant Examiner*—Jerome Grant, II
*Attorney, Agent, or Firm*—Joseph S. Tripoli; Eric P. Herrmann; Ronald H. Kurdyla

[57] ABSTRACT

In an MPEG multi-channel audio signal processor, a decoder requires a respective decoder matrix for determining different output channels from coded audio data. Some transmitted information indicates basic parameters of the multi-channel system. This information may be used to address a currently required decoder matrix which is stored in a decoder memory. The storage of a large number of such matrices would be required to enable the decoder to decode all possible channel configurations. Instead of addressing a required decoder matrix stored in decoder memory, initially the current encoder matrix is reconstructed in the decoder using the related transmitted information. The required decoder matrix is then computed from the reconstructed encoder matrix using a matrix inversion technique.

3 Claims, 1 Drawing Sheet

METHOD FOR GENERATING A MULTI-CHANNEL AUDIO DECODER MATRIX

This invention concerns a method for generating a multi-channel decoder matrix, and the use of such method in decoder devices in sound reproducing systems.

BACKGROUND OF THE INVENTION

Conventional two-channel sound systems exhibit shortcomings so as to allow enhanced performance in stereophonic and/or multi-lingual modes. Improved performance is desirable not only for audio with video applications, but also for audio-only applications. A universal compatible multi-channel sound system applicable to sound and television broadcasting (e.g., satellite or terrestrial TV broadcasting), digital audio broadcasting (terrestrial and satellite), as well as other non-broadcasting media appear to be attractive to the manufacturer, producer and consumer. Examples of such other non-broadcasting media include:

| | |
|---|---|
| CATV | Cable TV Distribution |
| CDAD | Cable Digital Audio Distribution |
| ENG | Electronic News Gathering (including Satellite News Gathering) |
| IPC | Interpersonal Communications (videoconferencing, video-phone, etc.) |
| ISM | Interactive Storage Media (optical disks, etc.) |
| NDB | Network Database Services (via ATM, etc.) |
| DSM | Digital Storage Media (digital VTR, etc.) |
| EC | Electronic Cinema |
| HTT | Home Television Theatre |
| ISDN | Integrated Service Digital Network. |

The standardized ISO/MPEG-Audio Multichannel system is an audio subband coding system which can be used to transfer high quality digital multi-channel and/or multi-lingual audio information on limited capacity channels. One of the basic features of such system is the backwards compatibility to ISO 11172-3 IS coded mono, stereo or dual channel audio programs, and is designed for use in different applications.

In stereophonic applications, the use of an additional center loudspeaker channel C and two left and right (rear) surround loudspeaker channels Ls and Rs is recommended to augment the front left and right loudspeaker channels L and R. This format is referred to as "3/2-stereo" (3 front/2 surround loudspeaker channels), and requires the transmission of five appropriately formatted sound signals.

For video with sound applications (e.g. High Definition Television, or HDTV), the three front loudspeaker channels provide sufficient directional stability and clarity of picture related frontal images, according to common practice in cinema. The main benefit is a "stable center", which is provided at most listener locations, and is important for dialogue. Also, for audio-only applications, the 3/2-stereo format has been found to improve the two-channel stereo effect. The addition of one pair of surround loudspeaker channels, e.g., to the rear of the listener, provides improved realism of sound ambience. Basically, the transmission of the five audio signals of a 3/2 sound system requires five transmission channels. In the context of bit-rate reduced signals, these channels are not necessarily totally independent. In order for two of the transmitted signals to provide a stereo service on their own, the source sound signals are generally combined in a linear matrix prior to encoding. These combined signals (and their transmission channels) are identified by notations T1, T2, T3, T4 and T5.

T1–T5 generally designate the five audio transmission channels in accordance with the MPEG audio standard, e.g., ISO/IEC 13818-3. Briefly, T1 corresponds to the mixed audio signal actually transmitted in the standard left stereo channel Lo. T2 corresponds to the mixed audio signal actually transmitted in the standard right stereo channel Ro. T1 is mixed from signals L, C and Ls. T2 is mixed from R, C and Rs T3 corresponds to a pure L signal. T4 corresponds to a pure R signal. T5 corresponds to a pure Ls signal. For compatibility reasons, an audio decoder compatible with the ISO 11172-3 IS standard properly decodes the basic stereo information, consisting of basic left and right channels. The signals in these channels constitute an appropriate downmix of the audio information in all channels. The appropriate downmix equations are given by the following expressions (T1 and T2 correspond to Lo and Ro):

$$Lo = L + x*C + y*Ls \qquad (1)$$

$$Ro = R + x*C + y*Rs \qquad (2)$$

In the above expressions "x" and "y" represent factors (e.g., 0.707 and 0.5 as will be seen) which indicate shared portions of pure source signals L, R, C, Rs and Ls.

A parameter TC Allocation contains information concerning the transmission channel allocation in a subband group, as indicated by the following table. In accordance with the MPEG audio standard, the audio spectrum is divided into 32 subbands.

| TC Allocation | T3 | T4 | T5 |
|---|---|---|---|
| 0 | L | R | C |
| 1 | L | R | LS |
| 2 | L | R | RS |
| 3 | L | C | LS |
| 4 | L | C | RS |
| 5 | L | LS | RS |
| 6 | R | C | LS |
| 7 | R | C | RS |
| 8 | R | LS | RS |
| 9 | C | LS | RS |
| 10 | L | R | — |
| 11 | LS | RS | — |
| 12 | L | — | — |
| 13 | R | — | — |
| 14 | C | — | — |
| 15 | — | — | — |

The TC Allocation parameter designations 0–15 indicate various combinations of the five basic source signals, i.e., transmission channel allocation for all subbands. Further details are described in MPEG document "ISO 11172-3 Compatible Low Bit Rate Multi-Channel Audio Coding and Conventional Stereo Coding at Lower Sampling Frequencies", ISO/IEC JTC1/SC29/WG11 N0403, MPEG93/479, 11. June 1993.

SUMMARY OF THE INVENTION

In accordance with the principles of the invention a decoder matrix is provided in a decoder device without storing a decoder matrix table containing multiples of these matrices. Required values, e.g., for equations (1) and (2), may be represented by a multichannel (MC) encoder matrix of the following type, for example:

$$\begin{bmatrix} Lo \\ Ro \\ T3 \\ T4 \\ T5 \end{bmatrix} = \begin{bmatrix} 1 & 0 & x & y & 0 \\ 0 & 1 & x & 0 & y \\ 0 & 1 & 0 & 0 & 0 \\ 1 & 0 & 0 & 0 & 0 \\ 0 & 0 & 0 & 1 & 0 \end{bmatrix} * \begin{bmatrix} R \\ L \\ C \\ Ls \\ Rs \end{bmatrix}$$

In this matrix, the value "0" indicates that the respective signal source (L, R, C, Ls or Rs) is not contained in the respective channel (Lo, Ro, T3, T4 or T5). The value "1" indicates that the respective source signal is fully contained in the respective channel. The values "x" and "y" indicate the portion of the respective source signal that is transmitted in the respective channel. In a decoder, the inverse matrix is required to extract the values L, R, C, Ls and Rs. Variations of these parameters would produce a large number of different decoder matrices even if many of them are not useful or not possible.

Several (e.g. 10) transmitted bits represent, e.g., the values x and y, center YES/NO, surround NO/MONO/STEREO, and the content of T3, T4 and T5. These bits can be used to address a large decoder memory containing corresponding inverse matrices. Since it is expensive to implement all decoder matrix combinations in a memory look-up table in a consumer decoder device, the number of combinations must be reduced. Advantageously, instead of addressing a decoder matrix stored in a decoder memory, initially the current encoder matrix can be reconstructed in the decoder using related transmitted information. The required decoder matrix afterwards can be computed from the reconstructed encoder matrix. The necessary computation time is significantly lower than the required computation time for a decoder audio signal filter.

In this regard it is noted that in the case of a decoder that has stored data pertaining to all possible configurations, it is only necessary to address the memory location for selecting the configuration to be calculated or transmitted. If, as in the case of the disclosed system, the decoder has not stored all the configurations, the required parameters need to be decoded in real time. In accordance with the MPEG standard, the audio signal information to be encoded is partitioned into frames which contain header information and coded samples. When a configuration is addressed or computed, source signals L, R, C, Ls, Rs need to be computed from transmitted audio signals Lo and Ro. Such computation can be regarded as a filtering or interpolation process. If the additionally required computation time needed to construct a given configuration is negligible, the benefit of less memory is more advantageous than the disadvantage of increased computation (i.e., faster hardware).

The disclosed method is suitable for obtaining a multichannel decoder matrix in a system providing information indicating the kind of signal to be decoded, where such signal has previously been coded using a corresponding encoder matrix and where such indicating information comprises channel on/off data, channel factor data (i.e., the share of source signals indicated by values x and y), and channel allocation data (designated by the TC Allocation parameter). The method comprises the steps of:

(a) reconstructing from the indication information the size of the encoder matrix, and inserting corresponding 0/1 values into the reconstructed encoder matrix;

(b) inserting values related to the channel factor data into the reconstructed encoder matrix;

(c) evaluating the channel allocation data and inserting such data into the remaining positions of the encoder matrix; and (d) performing a matrix inversion of the reconstructed encoder matrix to obtain the decoder matrix.

DETAILED DESCRIPTION OF PREFERRED EMBODIMENTS

Figure 1:
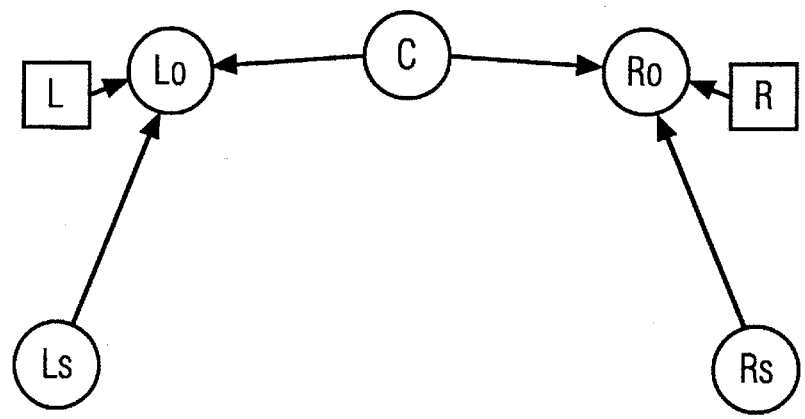
FIG. 1 represents an arrangement of left/right main, center and surround sound channels.

FIG. 1 shows left and right main channels L and R together with an additional center channel C and left and right surround channels $L_S$ and $R_S$. For MPEG1/MPEG2 compatibility, signals Lo, Ro (which include the significant audio information) and T3, T4 and T5 are transmitted instead of signals Ls, Rs and C. The decoder matrices for each of the 11 subband groups per frame are indicated by the following header bits:

| Bitstream | Information | No./frame | Bits | Total |
| --- | --- | --- | --- | --- |
| MPEG1 | MODE | 1 | 2 | 2 |
| MPEG2 | Center | 1 | 1 | 1 |
| " | Surround | 1 | 2 | 2 |
| " | Presentation Matrix | 1 | 2 | 2 |
| " | TC Allocation | [1 or] 11 | 3 | 33 |
| Sum | | | 10 | 40 |

In this table the heading "No./frame" refers to the quantity of an information item per frame. For example, TC Allocation has 3 bits and is normally transmitted 11 times per frame, resulting in 33 bits per frame for this type of information. "Presentation Matrix" information refers to the first two rows of the encoder matrix, i.e., equations (1) and (2) for Lo and Ro discussed previously. This number of bits (10) can theoretically produce 1024 (i.e., $2^{10}$) different decoder matrices. To reduce this large number, the multi-channel feature can be restricted to the MPEG1 "stereo" and "joint stereo" modes, for example. But this means that front/rear combination such as 1/2 and 1/1 or 1/0+1/0+2/0 are not allowed. The remaining combinations are indicated by the following list. In this listing, for example, L R C S (3/1) designates left, right and center front channels and one (rear) surround channel S. Similarly, L R Ls Rs (2/2) designates left and right main front channels and left and right surround (rear) channels.

In the following table, the "Joint Stereo" mode is a mode wherein data reduction is greater because irrelevant and redundant information between stereo channels is exploited. This is performed by mixing L and R information in one or more subbands. An amplitude scale factor is calculated for each channel. The mixed signal is transmitted as a monophonic signal with both scale factors. "M" refers to a pure monophonic source, and "M1M2" refers to two independent monophonic sources transmitted in a stereophonic channel pair. "Dual" refers to two monophonic channels belonging to one program (e.g., a bilingual broadcast). "Mono" refers to one monophonic channel belonging to one program. "MC" refers to multi-channel, and "ML" refers to multi-language.

Signal Configuration table:

| MPEG1 Mode | MPEG2 Center | Surround | Signal Configuration |
|---|---|---|---|
| Stereo & Joint Stereo | yes | no | LRC (3/0) |
| | | mono | LRCS (3/1) |
| | | stereo | LRCLsRs (3/2) |
| | | second stereo | LRCL2R2 (3/0 + 2/0) |
| | no | no | LR (no MC) |
| | | mono | LRS (2/1) |
| | | stereo | LRLsRs (2/2) |
| | | second stereo | LRL2R2 (2/0 + 2/0) |
| Dual | no | no | M1M2 (no MC) |
| Single | no | no | M (no MC) |

The expression "no MC" does not mean "no ML".

The presentation matrix information from the MPEG bitstream can be used to determine how the basic stereo information Lo and Ro was generated at the encoder. Applicable combinations are listed in the following table. In the following table "X" designates "R+L," and "Xs" designates "Rs+Ls." The symbol for infinity indicates a channel sharing factor of essentially zero.

Compatible Basic Stereo table:

| Signal Config. | Presentation Matrix | Xo |
|---|---|---|
| LRCLsRs (3/2) | −3 dB S.; −3 dB C. | X + 0.707 C + 0.707 Xs |
| | −6 dB S.; −3 dB C. | X + 0.707 C + 0.5 Xs |
| | −∞ dB S.; −3 dB C. | X + 0.707 C |
| | −∞ dB S.; −∞ dB C. | X |
| LRCS | −3 dB S.; −3 dB C. | X + 0.707 C + 0.707 S |
| (3/1) | −6 dB S.; −3 dB C. | X + 0.707 C + 0.5 S |
| | −∞ dB S.; −3 dB C. | X + 0.707 C |
| | −∞ dB S.; −∞ dB C. | X |
| LRCL2R2 (3/0 + 2/0) & LRC (3/0) | −3 dB S.; −3 dB C. | X + 0.707 C |
| | −6 dB S.; −3 dB C. | X + 0.707 C |
| | −∞ dB S.; −3 dB C. | X + 0.707 C |
| | −∞ dB S.; −∞ dB C. | X |
| LRLsRs (2/2) | −3 dB S.; −3 dB C. | X + 0.707 Xs |
| | −6 dB S.; −3 dB C. | X + 0.5 Xs |
| | −∞ dB S.; −3 dB C. | X |
| | −∞ dB S.; −∞ dB C. | X |
| LRS (2/1) | −3 dB S.; −3 dB C. | X + 0.707 S |
| | −6 dB S.; −3 dB C. | X + 0.5 S |
| | −∞ dB S.; −3 dB C. | X |
| | −∞ dB S.; −∞ dB C. | X |
| LRL2R2 (2/0 + 2/0) | −3 dB S.; −3 dB C. | X |
| | −6 dB S.; −3 dB C. | X |
| | −∞ dB S.; −3 dB C. | X |
| | −∞ dB S.; −∞ dB C. | X |

All useful information is collected for an entire frame. Finally, information about the allocation of the transport channels is needed, i.e., which audio channel is in which transport channel for a subband group. An audio channel may contain one or several of source signals L, R, C, Ls, Rs. This information is indicated by the TC Allocation parameter. For each signal configuration another list is used. The table below shows some permitted possibilities. In this table "MTX No." indicates numbers assigned to various encoder matrices, but other numbers or symbols could be used.

TC Allocation table:

| Signal Config. | Presentation Matrix | TC Alloc. | (T1) | (T2) | T3 | T4 | T5 | MTX (Matrix) No. |
|---|---|---|---|---|---|---|---|---|
| LRCLsRs (3/2) | −3 dB S; −3 dB C | 0 | L | R | C | LS | RS | 1/1 |
| | | 1 | C | R | L | LS | RS | 2/2 |
| | | 2 | L | C | R | LS | RS | 3/3 |
| | | 3 | $L_s$ | R | C | L | RS | 4/4 |
| | | 4 | L | R | C | LS | R | 5/5 |
| | | 5 | L | R | C | L | R | 6/6 |
| | | 6 | L | C | R | L | RS | 7/7 |
| | | 7 | C | R | L | LS | R | 8/8 |
| | | 8 | — | — | | | | (x/x) |
| | | 9 | — | — | | | | (x/x) |
| | | 10 | — | | | | | (x/x) |
| | | 11 | — | — | | dyn. crosstalk | | (x/x) |
| | | 12 | — | — | | | | (x/x) |
| | | 13 | — | — | | | | (x/x) |
| | | 14 | — | — | | | | (x/x) |
| | | 15 | — | — | | | | (x/x) |
| | −6 dB S; −3 dB C | 0 | L | R | C | LS | RS | 1/9 |
| | | 1 | C | R | L | LS | RS | 2/10 |
| | | 2 | L | C | R | LS | RS | 3/11 |
| | | 3 | $L_s$ | R | C | L | RS | 4/12 |
| | | 4 | L | $R_s$ | C | LS | R | 5/13 |
| | | 5 | $L_s$ | $R_s$ | C | L | R | 6/14 |
| | | 6 | $L_s$ | C | R | L | RS | 7/15 |
| | | 7 | C | $R_s$ | L | LS | R | 8/16 |
| | | x | — | — | | dyn. crosstalk | | (x/x) |
| | −∞ dB S; −3 dB C | 0 | L | R | C | LS | RS | 1/17 |
| | | 1 | C | R | L | LS | RS | 2/18 |
| | | 2 | L | C | R | LS | RS | 3/19 |
| | | x | — | — | | dyn. crosstalk | | (x/x) |

-continued

TC Allocation table:

| Signal Config. | Presentation Matrix | TC Alloc. | (T1) | (T2) | T3 | T4 | T5 | MTX (Matrix) No. |
|---|---|---|---|---|---|---|---|---|
|  | −∞ dB S.; −∞ dB C | 0 | L | R | C | LS | RS | 1/20 |
|  |  | x | — | — | dyn. crosstalk |  |  | (x/x) |
| LRCS (3/1) | −3 dB S; −3 dB C | 0 | L | R | C | S | — | 9/21 |
|  |  | 1 | C | R | L | S | — | 10/22 |
|  |  | 2 | L | C | R | S | — | 11/23 |
|  |  | 3 | S | R | C | L | — | 12/24 |
|  |  | 4 | L | S | C | R | — | 13/25 |
|  |  | x | — | — | dyn. crosstalk |  |  | (x/x) |
|  | −6 dB S; −3 dB C | 0 | L | R | C | S | — | 9/26 |
|  |  | 1 | C | R | L | S | — | 10/27 |
|  |  | 2 | L | C | R | S | — | 11/28 |
|  |  | 3 | S | R | C | L | — | 12/29 |
|  |  | 4 | L | S | C | R | — | 13/30 |
|  |  | x | — | — | dyn. crosstalk |  |  | (x/x) |
|  | −∞ dB S.; −3 dB C | 0 | L | R | C | S | — | 9/31 |
|  |  | 1 | C | R | L | S | — | 11/32 |
|  |  | 2 | L | C | R | S | — | 11/33 |
|  |  | x | — | — | dyn. crosstalk |  |  | (x/x) |
|  | −∞ dB S.; −∞ dB C | 0 | L | R | C | S | — | 9/34 |
|  |  | x | — | — | dyn. crosstalk |  |  | (x/x) |
| LRCL2R2 (3/0 + 2/0) & LRC (3/0) | −3 dB S; −3 dB C | 0 | L | R | C | (L2) | (R2) | 14/35 |
|  |  | 1 | C | R | L | (L2) | (R2) | 15/36 |
|  |  | 2 | L | C | R | (L2) | (R2) | 16/37 |
|  |  | x | — | — | dyn. crosstalk |  |  | (x/x) |
|  | −6 dB S; −3 dB C | 0 | L | R | C | (L2) | (R2) | 14/38 |
|  |  | 1 | C | R | L | (L2) | (R2) | 15/39 |
|  |  | 2 | L | C | R | (L2) | (R2) | 16/40 |
|  |  | x | — | — | dyn. crosstalk |  |  | (x/x) |
|  | −∞ dB S.; −3 dB C | 0 | L | R | C | (L2) | (R2) | 14/41 |
|  |  | 1 | C | R | L | (L2) | (R2) | 15/42 |
|  |  | 2 | L | C | R | (L2) | (R2) | 16/43 |
|  |  | x | — | — | dyn. crosstalk |  |  | (x/x) |
|  | −∞ dB S.; −∞ dB C | 0 | L | R | C | (L2) | (R2) | 14/44 |
|  |  | x | — | — | dyn. crosstalk |  |  | (x/x) |
| LRLsRs (2/2) | −3 dB S; −3 dB C | 0 | L | R | LS | RS | — | 17/45 |
|  |  | 3 | $L_s$ | R | L | RS | — | 18/46 |
|  |  | 4 | L | $R_s$ | LS | R | — | 19/47 |
|  |  | 5 | $L_s$ | R | L | R | — | 20/48 |
|  |  | x | — | — | dyn. crosstalk |  |  | (x/x) |
|  | −6 dB S; −3 dB C | 0 | L | R | LS | RS | — | 17/49 |
|  |  | 3 | $L_s$ | R | L | RS | — | 18/50 |
|  |  | 4 | L | $R_s$ | LS | R | — | 19/51 |
|  |  | 5 | $L_s$ | R | L | R | — | 20/52 |
|  |  | x | — | — | dyn. crosstalk |  |  | (x/x) |
|  | −∞ dB S.; −3 dB C | 0 | L | R | LS | RS | — | 17/53 |
|  |  | x | — | — | dyn. crosstalk |  |  | (x/x) |
|  | −∞ dB S.; −∞ dB C | 0 | L | R | LS | RS | — | 17/54 |
|  |  | x | — | — | dyn. crosstalk |  |  | (x/x) |
| LRS (2/1) | −3 dB S; −3 dB C | 0 | L | R | S | — | — | 21/55 |
|  |  | 3 | S | R | L | — | — | 22/56 |
|  |  | 4 | L | S | R | — | — | 23/57 |
|  |  | x | — | — | dyn. crosstalk |  |  | (x/x) |
|  | −6 dB S; −3 dB C | 0 | L | R | S | — | — | 21/58 |
|  |  | 3 | S | R | L | — | — | 22/59 |
|  |  | 4 | L | S | R | — | — | 23/60 |
|  |  | x | — | — | dyn. crosstalk |  |  | (x/x) |
|  | −∞ dB S.; −∞ dB C | 0 | L | R | S | — | — | 21/61 |
|  |  | x | — | — | dyn. crosstalk |  |  | (x/x) |
|  | −∞ dB S.; −∞ dB C | 0 | L | R | S | — | — | 21/62 |
|  |  | x | — | — | dyn. crosstalk |  |  | (x/x) |
| LR (2/0) | −3 dB S; −3 dB C | no | L | R | (L2) | (R2) | — | no |
|  | −6 dB S; −3 dB C | no | L | R | (L2) | (R2) | — | no |
| LRL2R2 (2/0 + 2/0) | −∞ dB S.; −3 dB C | no | L | R | (L2) | (R2) | — | no |
|  | −∞ dB S.; −∞ dB C | no | L | R | (L2) | (R2) | — | no |

When a system is restricted to MPEG 1 "stereo" and "joint stereo" only, no further matrices seem to be possible. Therefore the storage of 23 types leading to 62 real decoder matrices without dynamic cross talk are required. In the above table, "dyn(amic) crosstalk" refers to a portion of the stereophonic signal which is not relevant to spatial perception of the stereophonic image. Such irrelevant information is not masked but does not contribute to the localization of sound sources. Stereo-irrelevant components of any stereo signal (L, R, C, Ls, Rs) may be reproduced by one or more loudspeakers without affecting the stereophonic image. The last entry in the above list gives a matrix type/real number. All 23 encoder and decoder matrix types are listed below.

Encoder and decoder matrices:
(the second matrix column is produced by matrix inversion)

Example:

Encoder $$\begin{bmatrix} Lo \\ Ro \\ T3 \\ T4 \\ T5 \end{bmatrix} = \begin{bmatrix} 1 & 0 & x & y & 0 \\ 0 & 1 & x & 0 & y \\ 1 & 0 & 0 & 0 & 0 \\ 0 & 1 & 0 & 0 & 0 \\ 0 & 0 & 1 & 0 & 0 \end{bmatrix} \begin{bmatrix} R \\ L \\ C \\ Ls \\ Rs \end{bmatrix} \quad x = \sqrt{\tfrac{1}{2}} \quad y1 = \sqrt{\tfrac{1}{2}} \quad y2 = \tfrac{1}{2}$$

Decoder

Reconstruction  Inversion

1)
$$\begin{bmatrix} 1 & 0 & x & y & 0 \\ 0 & 1 & x & 0 & y \\ 0 & 0 & 1 & 0 & 0 \\ 0 & 0 & 0 & 1 & 0 \\ 0 & 0 & 0 & 0 & 1 \end{bmatrix} \begin{bmatrix} 1 & 0 & -x & -y & 0 \\ 0 & 1 & -x & 0 & -y \\ 0 & 0 & 1 & 0 & 0 \\ 0 & 0 & 0 & 1 & 0 \\ 0 & 0 & 0 & 0 & 1 \end{bmatrix} \quad \begin{array}{l} x = 0.70711 \\ y1 = 0.70711 \\ y2 = 0.5 \end{array}$$

2)
$$\begin{bmatrix} 1 & 0 & x & y & 0 \\ 0 & 1 & x & 0 & y \\ 1 & 0 & 0 & 0 & 0 \\ 0 & 0 & 0 & 1 & 0 \\ 0 & 0 & 0 & 0 & 1 \end{bmatrix} \begin{bmatrix} 0 & 0 & 1 & 0 & 0 \\ -1 & 1 & 1 & y & -y \\ \tfrac{1}{x} & 0 & \tfrac{-1}{x} & \tfrac{-y}{x} & 0 \\ 0 & 0 & 0 & 1 & 0 \\ 0 & 0 & 0 & 0 & 1 \end{bmatrix} \quad \begin{array}{l} \tfrac{y1}{x} = 1 \\ \tfrac{y2}{x} = 0.70711 \\ \tfrac{1}{x} = 1.41421 \end{array}$$

3)
$$\begin{bmatrix} 1 & 0 & x & y & 0 \\ 0 & 1 & x & 0 & y \\ 0 & 1 & 0 & 0 & 0 \\ 0 & 0 & 0 & 1 & 0 \\ 0 & 0 & 0 & 0 & 1 \end{bmatrix} \begin{bmatrix} 1 & -1 & 1 & -y & y \\ 0 & 0 & 1 & 0 & 0 \\ 0 & \tfrac{1}{x} & \tfrac{-1}{x} & 0 & \tfrac{-y}{x} \\ 0 & 0 & 0 & 1 & 0 \\ 0 & 0 & 0 & 0 & 1 \end{bmatrix}$$

4)
$$\begin{bmatrix} 1 & 0 & x & y & 0 \\ 0 & 1 & x & 0 & y \\ 0 & 0 & 1 & 0 & 0 \\ 1 & 0 & 0 & 0 & 0 \\ 0 & 0 & 0 & 0 & 1 \end{bmatrix} \begin{bmatrix} 0 & 0 & 0 & 1 & 0 \\ 0 & 1 & -x & 0 & -y \\ 0 & 0 & 1 & 0 & 0 \\ \tfrac{1}{y} & 0 & \tfrac{-1x}{y} & \tfrac{-1}{y} & 0 \\ 0 & 0 & 0 & 0 & 1 \end{bmatrix} \quad \begin{array}{l} \tfrac{x}{y1} = 1 \\ \tfrac{x}{y2} = 1.41421 \\ \tfrac{1}{y1} = 1.41421 \\ \tfrac{1}{y2} = 2 \end{array}$$

5)
$$\begin{bmatrix} 1 & 0 & x & y & 0 \\ 0 & 1 & x & 0 & y \\ 0 & 0 & 1 & 0 & 0 \\ 0 & 0 & 0 & 1 & 0 \\ 0 & 1 & 0 & 0 & 0 \end{bmatrix} \begin{bmatrix} 1 & 0 & -x & -y & 0 \\ 0 & 0 & 0 & 0 & 1 \\ 0 & 0 & 1 & 0 & 0 \\ 0 & 0 & 0 & 1 & 0 \\ 0 & \tfrac{1}{y} & \tfrac{-1x}{y} & 0 & \tfrac{-1}{y} \end{bmatrix}$$

6)
$$\begin{bmatrix} 1 & 0 & x & y & 0 \\ 0 & 1 & x & 0 & y \\ 0 & 0 & 1 & 0 & 0 \\ 1 & 0 & 0 & 0 & 0 \\ 0 & 1 & 0 & 0 & 0 \end{bmatrix} \begin{bmatrix} 0 & 0 & 0 & 1 & 0 \\ 0 & 0 & 0 & 0 & 1 \\ 0 & 0 & 1 & 0 & 0 \\ \tfrac{1}{y} & 0 & \tfrac{-1x}{y} & \tfrac{-1}{y} & 0 \\ 0 & \tfrac{1}{y} & \tfrac{-1x}{y} & 0 & \tfrac{-1}{y} \end{bmatrix}$$

7)
$$\begin{bmatrix} 1 & 0 & x & y & 0 \\ 0 & 1 & x & 0 & y \\ 0 & 1 & 0 & 0 & 0 \\ 1 & 0 & 0 & 0 & 0 \\ 0 & 0 & 0 & 0 & 1 \end{bmatrix} \begin{bmatrix} 0 & 0 & 0 & 1 & 0 \\ 0 & 0 & 1 & 0 & 0 \\ 0 & \tfrac{1}{x} & \tfrac{-1}{x} & 0 & \tfrac{-y}{x} \\ \tfrac{1}{y} & \tfrac{-1}{y} & \tfrac{1}{y} & \tfrac{-1}{y} & 1 \\ 0 & 0 & 0 & 0 & 1 \end{bmatrix}$$

8)
$$\begin{bmatrix} 1 & 0 & x & y & 0 \\ 0 & 1 & x & 0 & y \\ 1 & 0 & 0 & 0 & 0 \\ 0 & 0 & 0 & 1 & 0 \\ 0 & 1 & 0 & 0 & 0 \end{bmatrix} \begin{bmatrix} 0 & 0 & 1 & 0 & 0 \\ 0 & 0 & 0 & 0 & 1 \\ \tfrac{1}{x} & 0 & \tfrac{-1}{x} & \tfrac{-y}{x} & 0 \\ 0 & 0 & 0 & 1 & 0 \\ \tfrac{-1}{y} & \tfrac{1}{y} & \tfrac{1}{y} & 1 & \tfrac{-1}{y} \end{bmatrix}$$

Example:

$$\begin{bmatrix} Lo \\ Ro \\ T3 \\ T4 \end{bmatrix} = \begin{bmatrix} 1 & x & 0 & y \\ 0 & 0 & 0 & 0 \\ 1 & 0 & 0 & 0 \\ 0 & 1 & 0 & 0 \end{bmatrix} \begin{bmatrix} L \\ R \\ C \\ S \end{bmatrix}$$

9)
$$\begin{bmatrix} 1 & 0 & x & y \\ 0 & 1 & x & y \\ 0 & 0 & 1 & 0 \\ 0 & 0 & 0 & 1 \end{bmatrix} \begin{bmatrix} 1 & 0 & -x & -y \\ 0 & 1 & -x & -y \\ 0 & 0 & 1 & 0 \\ 0 & 0 & 0 & 1 \end{bmatrix}$$

10)
$$\begin{bmatrix} 1 & 0 & x & y \\ 0 & 1 & x & y \\ 1 & 0 & 0 & 0 \\ 0 & 0 & 0 & 1 \end{bmatrix} \begin{bmatrix} 0 & 0 & 1 & 0 \\ -1 & 1 & 1 & 0 \\ \tfrac{1}{x} & 0 & \tfrac{-1}{x} & \tfrac{-y}{x} \\ 0 & 0 & 0 & 1 \end{bmatrix}$$

11)
$$\begin{bmatrix} 1 & 0 & x & y \\ 0 & 1 & x & y \\ 0 & 1 & 0 & 0 \\ 0 & 0 & 0 & 1 \end{bmatrix} \begin{bmatrix} 1 & -1 & 1 & 0 \\ 0 & 0 & 1 & 0 \\ 0 & \tfrac{1}{x} & \tfrac{-1}{x} & \tfrac{-y}{x} \\ 0 & 0 & 0 & 1 \end{bmatrix}$$

12)
$$\begin{bmatrix} 1 & 0 & x & y \\ 0 & 1 & x & y \\ 0 & 0 & 1 & 0 \\ 1 & 0 & 0 & 0 \end{bmatrix} \begin{bmatrix} 0 & 0 & 0 & 1 \\ -1 & 1 & 0 & 1 \\ 0 & 0 & 1 & 0 \\ \tfrac{1}{y} & 0 & \tfrac{-x}{y} & \tfrac{-1}{y} \end{bmatrix}$$

13)
$$\begin{bmatrix} 1 & 0 & x & y \\ 0 & 1 & x & y \\ 0 & 0 & 1 & 0 \\ 0 & 1 & 0 & 0 \end{bmatrix} \begin{bmatrix} 1 & -1 & 0 & 1 \\ 0 & 0 & 0 & 1 \\ 0 & 0 & 1 & 0 \\ 0 & \tfrac{1}{y} & \tfrac{-x}{y} & \tfrac{-1}{y} \end{bmatrix}$$

Example:

$$\begin{bmatrix} Lo \\ Ro \\ T3 \end{bmatrix} = \begin{bmatrix} 1 & 0 & x \\ 0 & 1 & x \\ 1 & 0 & 0 \end{bmatrix} \begin{bmatrix} L \\ R \\ C \end{bmatrix}$$

14)
$$\begin{bmatrix} 1 & 0 & x \\ 0 & 1 & x \\ 0 & 0 & 1 \end{bmatrix} \begin{bmatrix} 1 & 0 & -x \\ 0 & 1 & -x \\ 0 & 0 & 1 \end{bmatrix}$$

15)
$$\begin{bmatrix} 1 & 0 & x \\ 0 & 1 & x \\ 1 & 0 & 0 \end{bmatrix} \begin{bmatrix} 0 & 0 & 1 \\ -1 & 1 & 1 \\ \tfrac{1}{x} & 0 & \tfrac{-1}{x} \end{bmatrix}$$

16)
$$\begin{bmatrix} 1 & 0 & x \\ 0 & 1 & x \\ 0 & 1 & 0 \end{bmatrix} \begin{bmatrix} 1 & -1 & 1 \\ 0 & 0 & 1 \\ 0 & \tfrac{1}{x} & \tfrac{-1}{x} \end{bmatrix}$$

Example:

$$\begin{bmatrix} Lo \\ Ro \\ T3 \\ T4 \end{bmatrix} = \begin{bmatrix} 1 & 0 & y & 0 \\ 0 & 1 & 0 & y \\ 0 & 0 & 1 & 0 \\ 0 & 0 & 0 & 1 \end{bmatrix} \begin{bmatrix} L \\ R \\ Ls \\ Rs \end{bmatrix}$$

-continued $$\begin{bmatrix} 1 & 0 & y & 0 \\ 0 & 1 & 0 & y \\ 0 & 0 & 1 & 0 \\ 0 & 0 & 0 & 1 \end{bmatrix} \begin{bmatrix} 1 & 0 & -y & 0 \\ 0 & 1 & 0 & -y \\ 0 & 0 & 1 & 0 \\ 0 & 0 & 0 & 1 \end{bmatrix}$$

17)

$$\begin{bmatrix} 1 & 0 & y & 0 \\ 0 & 1 & 0 & y \\ 1 & 0 & 0 & 0 \\ 0 & 0 & 0 & 1 \end{bmatrix} \begin{bmatrix} 0 & 0 & 1 & 0 \\ 0 & 1 & 0 & -y \\ \frac{1}{y} & 0 & \frac{-1}{y} & 0 \\ 0 & 0 & 0 & 1 \end{bmatrix}$$

18)

$$\begin{bmatrix} 1 & 0 & y & 0 \\ 0 & 1 & 0 & y \\ 0 & 0 & 1 & 0 \\ 0 & 1 & 0 & 0 \end{bmatrix} \begin{bmatrix} 1 & 0 & -y & 0 \\ 0 & 0 & 0 & 1 \\ 0 & 0 & 1 & 0 \\ 0 & \frac{1}{y} & 0 & \frac{-1}{y} \end{bmatrix}$$

19)

$$\begin{bmatrix} 1 & 0 & y & 0 \\ 0 & 1 & 0 & y \\ 1 & 0 & 0 & 0 \\ 0 & 1 & 0 & 0 \end{bmatrix} \begin{bmatrix} 0 & 0 & 1 & 0 \\ 0 & 0 & 0 & 1 \\ \frac{1}{y} & 0 & \frac{-1}{y} & 0 \\ 0 & \frac{1}{y} & 0 & \frac{-1}{y} \end{bmatrix}$$

20)

Example:

$$\begin{bmatrix} Lo \\ Ro \\ T3 \end{bmatrix} = \begin{bmatrix} 1 & 0 & y \\ 0 & 1 & y \\ 1 & 0 & 0 \end{bmatrix} \begin{bmatrix} L \\ R \\ S \end{bmatrix}$$

$$\begin{bmatrix} 1 & 0 & y \\ 0 & 1 & y \\ 0 & 0 & 1 \end{bmatrix} \begin{bmatrix} 1 & 0 & -y \\ 0 & 1 & -y \\ 0 & 0 & 1 \end{bmatrix}$$

21)

$$\begin{bmatrix} 1 & 0 & y \\ 0 & 1 & y \\ 1 & 0 & 0 \end{bmatrix} \begin{bmatrix} 0 & 0 & 1 \\ -1 & 1 & 1 \\ \frac{1}{y} & 0 & \frac{-1}{y} \end{bmatrix}$$

22)

$$\begin{bmatrix} 1 & 0 & y \\ 0 & 1 & y \\ 0 & 1 & 0 \end{bmatrix} \begin{bmatrix} 1 & -1 & 1 \\ 0 & 0 & 1 \\ 0 & \frac{1}{y} & \frac{-1}{y} \end{bmatrix}$$

23)

To avoid having to store these matrices in the decoder, the elements and the size of the matrix can be calculated from information contained in the headers of MPEG bitstream data packets. For example, the channel on/off data are:

| MPEG1 MODE: | stereo | L + R |
|---|---|---|
| MPEG2 Center: | yes | C |
| MPEG2 Surround: | mono | S |

I.e., in a 4-channel configuration the matrix assumes the following form:

| T1 |   | x | x | x | x |   | L |
|---|---|---|---|---|---|---|---|
| T2 | = | x | x | x | x | * | R |
| T3 |   | x | x | x | x |   | C |
| T4 |   | x | x | x | x |   | S |

From the above channel on/off data, matrix elements $X_{11}$, $X_{12}$, $X_{21}$ and $X_{22}$ have fixed binary values of 1, 0, 0, 1 respectively as shown.

| T1 |   | 1 | 0 | x | x |   | L |
|---|---|---|---|---|---|---|---|
| T2 | = | 0 | 1 | x | x | * | R |
| T3 |   | x | x | x | x |   | C |
| T4 |   | x | x | x | x |   | S |

The presentation matrix (channel factor data) gives useful information about the factors (e.g., attenuation) of the basic stereo channels. For example:

| Surround: | −6 dB = 0.5 |
|---|---|
| Center: | −3 dB = 0.707 |

Thus, the matrix exhibits values as follows:

| T1 |   | 1 | 0 | 0.7 | 0.5 |   | L |
|---|---|---|---|---|---|---|---|
| T2 | = | 0 | 1 | 0.7 | 0.5 | * | R |
| T3 |   | x | x | x | x |   | C |
| T4 |   | x | x | x | x |   | S |

Matrix lines 3 and 4 are missing in the above example. This information can be obtained from the TC Allocation table (channel allocation data), e.g. TC Allocation=2. The encoder matrix then appears as follows:

| T1 |   | 1 | 0 | 0.7 | 0.5 |   | L |
|---|---|---|---|---|---|---|---|
| T2 | = | 0 | 1 | 0.7 | 0.5 | * | R |
| T3 |   | 0 | 1 | 0 | 0 |   | C |
| T4 |   | 0 | 0 | 0 | 1 |   | S |

The decoder matrix is obtained by computing the inverse of the encoder matrix. Matrix inversion can be accomplished with Gaussian Elimination Algorithms, for example. This may be accomplished by using the following computer program.

allocation data), e.g. TC Allocation=2. The encoder matrix then appears as follows:

$$\begin{matrix} T1 \\ T2 \\ T3 \\ T4 \end{matrix} = \begin{matrix} 1 & 0 & 0.7 & 0.5 \\ 0 & 1 & 0.7 & 0.5 \\ 0 & 1 & 0 & 0 \\ 0 & 0 & 0 & 1 \end{matrix} * \begin{matrix} L \\ R \\ C \\ S \end{matrix}$$

The decoder matrix is obtained by computing the inverse of the encoder matrix. Matrix inversion can be accomplished with Gaussian Elimination Algorithms, for example. This may be accomplished by using the following computer program.

```
/*
Matrix Inversion with Gauss elimination
see (J. C. Nash, "Compact Numerical Methods for Computers", publ.
A. Hilger 1979, Page 62ff)
*/ include     <stdlib.h>
include     <stdio.h>
#include     <math.h>
#include     <float.h>

/*Max Matrix Size */
#define      M    5

/* prototype(s) */
void help(void);
void gauss_elimination(int N,float A[] [2*M+1]);

/*****************************************************/
void main(int argc, char *argv[])
{
    float   A[M+1] [2*M+1];
    int     i,j,N;
    FILE    *infile;
```

```
        printf(" \n");
        printf(" %s: Matrix Inversion TCE \n",__FILE__);

if(argc != 2) {
 5          help();
            exit(1);
        } printf(" The Datafile is : \"%s\" \n",argv[1]);
10
        if ((infile = fopen(argv[1],"r")) == NULL){
            printf(" (%d) File Open Error ",__LINE__);
            exit(1);
        }
15
        fscanf(infile,"%d",&N);
        if (N > M) {
            printf(" (%d) Matrix Size to lage ",__LINE__);
            exit(1);
20      }

/* Read Matrix */
        for (i=1;i<=N;i++)
            for(j=1;j<=N;j++)
25              fscanf(infile,"%f",&A[i][j]);

fclose(infile);

/* Input matrix with result matix, here unity matrix */
30      for(i=1;i<=N;i++)
            for(j=1;j<=N;j++){
                A[i] [N+j] = 0;
                if(i==j)A[i] [j+N] = 1;}

35      /* Output */
        printf(" Input matrix \n");
        for(i=1;i<=N;i++){
            for(j=1;j<=N;j++)
```

```
                printf("%10.6f ",A[i] [j]);
            printf("\n");
        }

5      /* Calculation */
        gauss_elimination(N,A);

/* Output */
        printf(" Invers Matrix \n");
10      for(i=1;i<+N;i++) {
            for(j=1;j<+N;i++)
                printf("%10.6f ",A[i] [j+N]);
            printf("\n");
        }
15  }
    /***********************************************************/
    void gauss_elimination(int N,float A[] [2*M+1])
    /* Gauss elimination with partial pivoting */
    {
20      int n,p;
        int j,k,h,i;
        float D, tol,s;

n = N;
25      p = N; /* Spezial case */
        D = 1.0;
        tol = FLT_EPSILON; /* 1.19e-7 or DBL_EPSILON*/ for (j=1;j<=n-1;j++){
30          /* Find the pivot */
            s = fabs(A[j] [j]); k = j;
            for (h=j+1;h<=n;h++){
                if (fabs(A[h] [j] > s)){
                    s = fabs(A[h] {j});
35                  k = h;
                }
            }/* end loop h */
            if (k != j ){
```

```
            for (i = j; i<= n+p;i++){
                s = A[k] [i]; A[k] [i] = A[j] [i]; A[j] [i] = s:
            } /* end loop i */
            D = -D;
        } /* end if(k != j) */

D = D * A[j] [j];
        if (fabs(A[j] [j]) <= tol) {
            printf (" \a \n (%d) Matrix is computationally singular \n",__LINE__);
            exit (100);
        }
        for (k=j+1; k<= n; k++){
            A[k] [j] = A[k] [j] / A[j] [j];
            for (i=j+1;i<=n+p;i++)
                A[k] [i] = A[k] [i] - A[k] [j] * A[j] [i];
        }/* end loop k */
    }/* end loop j */
    D = D * A[n] [n];
    if (fabs(A[n] [n]) <= tol) {
        printf(" \a \n (%d) Matrix is computationally singular \n",__LINE__);
        exit(101);
    }

/* Back-substitution */
    for(i=n+1; i<= n+p; i++){
        A[n] [i] = A[n] [i] / A[n] [n];
        for (j=n-1;j>=1;j--){
            s = A[j] [i];
            for (k=j+1; k<= n; k++){
                s = s - A[j] [k] * A[k] [i];
            } /* end loop k */
            A[j] [i] = s / A[j] [j];
        } /*end loop j */
    } /* end loop i */
}
/*****************************************************/
```

```
void help()
{
    float A[4] [4];
    int i,j;
    int N;
    N = M;

printf(" \n please typ \"programname datafile\" \n");
    printf(" The datafile must be in the following form: \n");
    printf(" \tN              <-- SIZE of Matrix (2. . %d)\n",N);
    printf(" \tA11 A12 A13 . . <- Matrix Elements\n");
    printf(" \tA21 A22 A23 . . \n");
    printf(" \t . . .. .. .. \n");

/* TestData */
    printf(" Testdata: \n");
    A[1] [1] = 1; A[1] [2] = 0; A[1] [3] = sqrt (0.5);
    A[2] [1] = 0; A[2] [2] = 1; A[2] [3] = sqrt (0.5);
    A[3] [1] = 1; A[3] [2] = 0; A[3] [3] = 0;
    printf("   3/n");
    for(i=1;i<=3;i++){
        for(j=1;j<=3;j++)
            printf("%18.14f ",A[i] [j]);
    printf("\n");
    } printf(" \nInverse Matrix: \n");
    A[1] [1] = 0;         A[1] [2] = 0;    A[1] [3] = 1;
    A[2] [1] = -1;        A[2] [2] = 1;    A[2] [3] = 1;
    A[3] [1] = sqrt (2.0); A[3] [2] = 0;   A[3] [3] = sqrt (2.0);
    for(i=1;i<=3;i++){
        for(j=1;j<=3;i++)
            printf("%18.14f ",A[i] [j]);
    printf("/n");
    }
}
/******************* END *************************/
```

The above routine requires 258 steps (including user messages and inputs and a debugger) to invert a 5*5 encoder matrix on a personal computer.

In the DSP32C library there is a function "matinf" which needs approximately 90 µs to perform one 5*5 matrix inversion. The DSP32C is a well-known digital signal processor commercially available from AT&T Corporation, for which standard software is available including, e.g., sine/cosine functions and matrix inversion functions. This produces a total computing time of approximately 1 ms for 11 full matrix inversions. In comparison, an MPEG decoder filter for 5 channels needs approximately 30 ms computing time. Thus, the matrix inversion effort requires only about 3.3% of the filter effort. Advantageously, computation of the decoder matrix within the decoder does not require that 62 matrices be stored, and does not restrict the quantity of possible encoder matrices.

Figure 2:
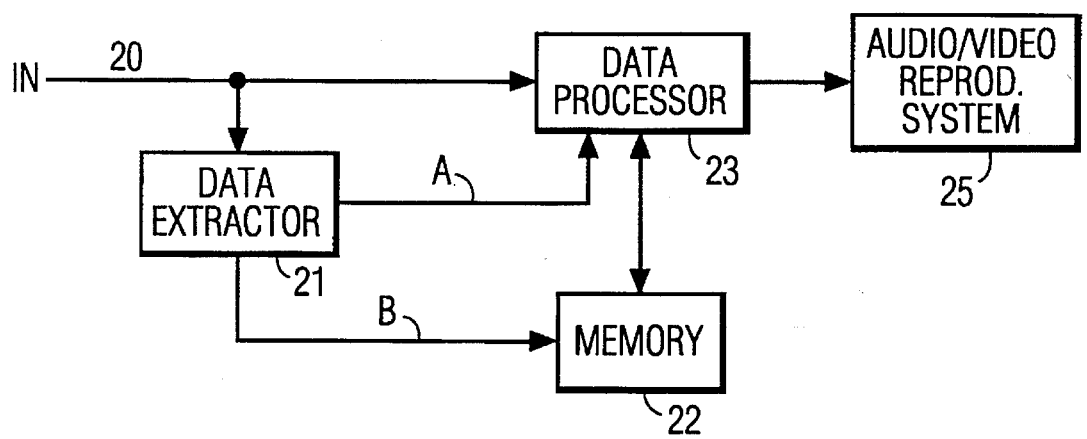
FIG. 2 is a block diagram of apparatus for computing a decoder matrix.

FIG. 2 is a block diagram of apparatus for performing decoder matrix computations. The computations can be made using a data extractor 21, which extracts header information from packets in MPEG data stream 20. The header information includes the required input parameters as discussed. Unit 21 has two outputs, A and B. Output A provides header data (e.g., TC Allocation data, data bit totals, etc. as discussed) that are used directly by processor 23 and are not needed for addressing memory 22. Output B of unit 21 includes memory addressing data. Memory unit 22 stores the respective computation software for operating on these input parameters to construct the decoder matrix. The output data of unit 22 are input together with the transmitted audio data of MPEG data stream 20 to a fast processor network 23, which applies the reconstructed decoder matrix to audio data to be provided to a respective sound reproducing (loudspeaker) system 25 from the output of processor 23. In this example unit 25 is an audio/video processing and reproduction network such as in a system including a television receiver. The apparatus of FIG. 2 may also be associated with a VCR, CD player or a computer associated with a display unit.

The disclosed system can be used in MPEG TV receivers, and in the application fields listed in the introduction of this disclosure.

I claim:

1. A method for obtaining a multiple audio channel (L, R, C, Ls, Rs) matrix in a decoder system having indication information concerning the type of signal (20) to be decoded, said signal having been previously coded using a corresponding encoder matrix, said indication information comprising channel on/off data, channel factor data, and channel allocation data, said method comprising the steps of:

(a) reconstructing from said indication information the size of said encoder matrix and inserting corresponding element values (0/1) into said reconstructed encoder matrix;

(b) inserting element values related to said channel factor data into said reconstructed encoder matrix;

(c) evaluating said channel allocation data;

(d) inserting evaluated channel allocation data into remaining positions of said encoder matrix; and (e) inverting said reconstructed encoder matrix to obtain said decoder matrix.

2. A method according to claim 1, further comprising the step of applying said obtained decoder matrix to an input audio data signal to recover multiple channel audio information.

3. A method according to claim 2, further comprising the step of applying said recovered multiple channel audio information to an audio/video reproduction system for providing information to an image display device.

* * * * *